Nov. 22, 1955 C. E. SWENSON 2,724,472
ONE WAY CLUTCHES AND BEARINGS
Filed Aug. 15, 1950
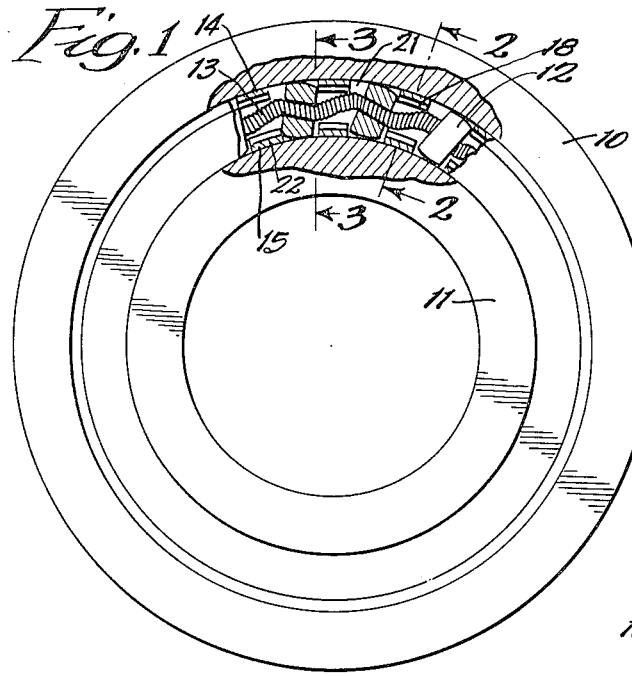
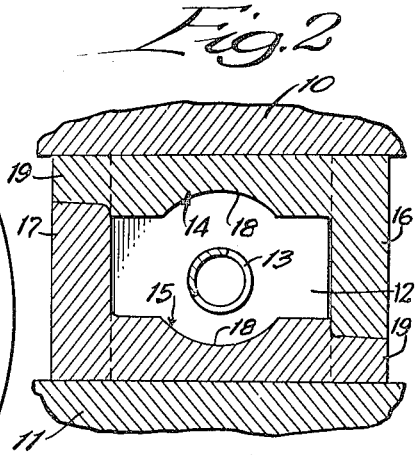
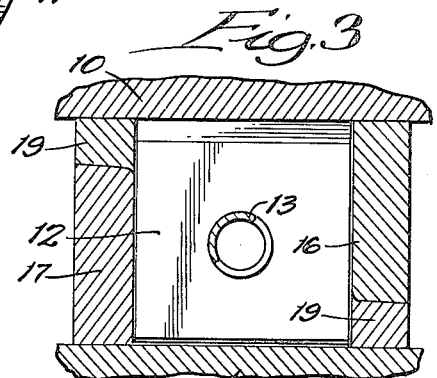
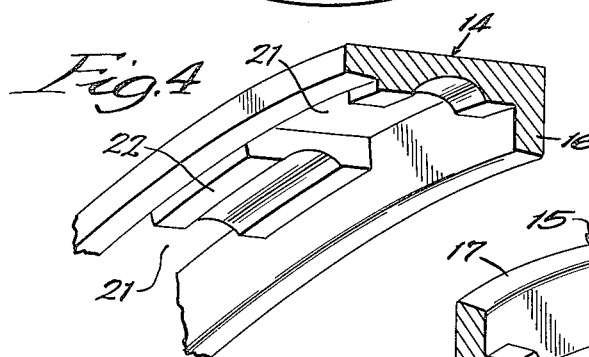
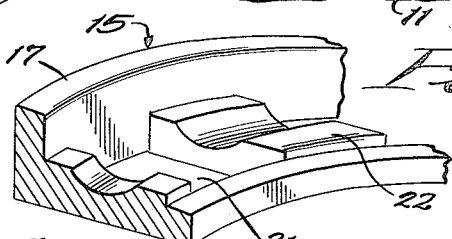
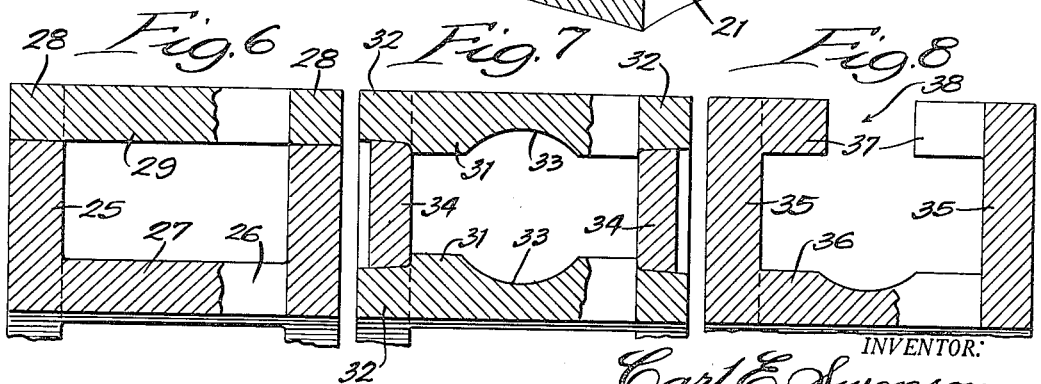
INVENTOR:
Carl E. Swenson,
BY
E. J. Booth,
ATTORNEY.

United States Patent Office 2,724,472
Patented Nov. 22, 1955

2,724,472

ONE WAY CLUTCHES AND BEARINGS

Carl E. Swenson, Rockford, Ill., assignor to Borg-Warner Corporation, Chicago, Ill., a corporation of Illinois Application August 15, 1950, Serial No. 179,543

6 Claims. (Cl. 192—45.1)

This invention relates to one-way clutches and bearings, and more particularly to a cage structure to function as a cage for the clutch grippers and to engage the races to act as a bearing between them.

In one-way clutches of the tilting-gripper type, cages are preferably employed to hold the grippers assembled and to assist in controlling them. In many instances it is also desirable to provide a bearing acting between the clutch races to carry bearing loads during overrunning.

In my prior Patent No. 2,366,842 there is disclosed and claimed a cast cage capable of functioning as a bearing, and while this construction is extremely fit it is relatively expensive except for large units, or for units which are required to carry relatively heavy bearing loads.

It is one of the objects of the present invention to provide a one-way clutch and bearing in which the cage is formed simply and inexpensively and provides an effective bearing for relatively light loads.

Another object is to provide a one-way clutch and bearing in which the cage is formed by one or more extruded strips bent into annular form. Two strips are employed which interfit to form a box section, and in another construction a single strip is employed which is generally box-shaped in section, with an annular opening in one web. In both constructions the webs are punched out to leave a plurality of spaced integral cross members between which the grippers are received.

Still another object is to provide a one-way clutch and bearing in which the tiltable grippers are connected by an annular spring, and the cage is formed with a hollow section to receive and protect the spring.

The above and other objects and advantages of the invention will be more readily apparent from the following description, when read in connection with the accompanying drawing in which:

Figure 1 is a side elevation with parts in section of a one-way clutch and bearing assembly embodying the invention; Figures 2 and 3 are enlarged sections on the lines 2—2 and 3—3, respectively, of Figure 1; Figures 4 and 5 are partial perspective views of the inner and outer cage strips; and Figures 6, 7 and 8 are broken sections similar to Figure 2 of alternative constructions.

The construction as illustrated in Figures 1 to 5 provides a one-way clutch and bearing to connect an outer race 10 having an inner cylindrical surface with an inner race 11 having a coaxial outer cylindrical surface. The races are adapted to be connected by a series of tiltable grippers 12 mounted between the race surfaces and having their ends curved about spaced centers to bind the races in one relative direction of rotation, and to release them for free relative rotation in the other direction. The grippers are preferably connected by an annular coiled spring 13 threaded through central openings in the grippers, as more particularly described and claimed in my Patent No. 2,386,018.

The grippers are held in place between the races and controlled by a cage which also functions as a bearing to connect the races during overrunning. In the embodiment of Figures 1 to 4 the cage is formed of a pair of L-shaped strips 14 and 15 of extruded metal. The strip 14 has its flange 16 extending inward, while the strip 15 has its flange 17 extending outward, so that when the strips are fitted together they form a box section. Each strip has a relatively thick central portion formed with a central groove 18, and terminates at its edge remote from its flange in an annular, relatively thin, side ring 19. When the strips are assembled the edges of the flanges interfit with the side rings, as shown in Figures 2 and 3, to provide a complete box section.

To accommodate the grippers the web portion of each of the rings between the flange and the side ring is punched or cut out, as indicated at 21, to leave a series of integral cross members 22 connecting the flanges and side rings. Preferably the outer surface of the strip 14 is a smooth cylindrical surface and the inner surface of the strip 15 is also a smooth cylindrical surface to fit slidably against the adjacent race surfaces.

To assemble the unit the grippers are inserted between the cross members 22 of one of the strips and are pressed through the openings between the cross members to the maximum extent. Due to the grooves 18, the spring 13 can move outwardly far enough to permit the other strip to be slipped over the end of the grippers to the assembled position illustrated in Figures 2 and 3. The cross members on the two strips are brought into alignment and the strips are then pressed tightly together to complete the assembly. If desired, the strips can be secured together by welding or by upsetting the metal. When the strips are assembled the grippers will extend through the openings in both strips, as shown in the drawing, to engage the inner and outer races. In operation the ends of the grippers will engage the cross members 22 to limit tilting of the grippers so that the spring will not be damaged. It will also be seen that the spring is housed entirely within the cage so that it will not be damaged during handling or assembly.

An alternative cage construction is illustrated in Figure 6 as comprising an extruded channel-shaped strip 25 bent into an annulus and having its web punched out, as indicated at 26, to leave a series of integral cross members 27 connecting its side flanges. A second strip is provided to fit over the open edge of the channel-shaped strip 25 and, as shown, comprises continuous side rings 28 connected by spaced integral cross members 29 registering with the cross members 27. This construction, when assembled, provides a complete box section to house and protect the spring in the same manner as described in connection with Figures 1 to 4, and the cross members 27 and 29 will limit tilting of the grippers in the same way. This unit also provides smooth cylindrical surfaces on the rings to engage the races so that it can function as a bearing during overrunning.

In the construction of Figure 7 two identical strips are provided, each of which has a relatively thick central portion 31 and narrower continuous side rings 32. The central portion 31 may be formed with a central groove 33 corresponding to the groove 18 of Figures 1 to 4, and may be punched out to provide spaced integral cross members connecting the side rings. One of these strips is rolled into an annulus with the groove 33 facing inward, and the other is rolled into a smaller annulus with its groove 33 facing outward. The two strips are connected and supported by end rings 34, which fit between their side rings 32 to form a complete cage assembly. This construction also limits tilting of the grippers and completely encloses the annular spring connecting the grippers to protect it.

Figure 8 illustrates another modified construction in which a strip, generally box-shaped in section, is rolled into an annulus. This strip, as shown, comprises annular side flanges 35 integrally connected by an inner web 36, which may be punched out to form integral cross members. At their outer edges the sides 35 have inwardly-extending integral web portions 37, which are punched out in the same way as the web 36 to provide integral cross members. The cross members formed by the web 37 are interrupted centrally of the cage structure to leave an annular opening 38 through which the spring 13 may be inserted in assembling the parts. However, both cross members 36 and 37 will engage the grippers to limit tilting thereof, and will house and protect the spring.

In each of the embodiments shown the cage is formed by one or more extruded strips rolled into annular form, and preferably having their ends connected by welding or a like operation. Thus all of the constructions shown can be formed very inexpensively and will provide an adequate cage structure for supporting the grippers and protecting the spring. Each of the cages also provides smooth inner and outer surfaces which are capable of functioning as bearing surfaces to transmit bearing loads between the races during overrunning.

While several embodiments of the invention have been shown and described in detail, it will be understood that these are illustrative only and are not to be taken as a definition of the scope of the invention, reference being had for this purpose to the appended claims.

What is claimed is:

1. A one-way clutch and bearing to fit between coaxial cylindrical races comprising an annular cage with side rings rigidly connected by spaced cross bars integral with the side rings, the cage having means defining cylindrical inner and outer surfaces slidably engaging the races, there being two sets of radially spaced cross bars engaging the inner and outer races respectively and which are relatively thin radially to leave an open space between them, tiltable grippers fitting between the side rings and between adjacent cross bars, and an annular spring connecting the grippers and lying in said open space.

2. A one-way clutch and bearing to fit between coaxial cylindrical races comprising an annular cage formed of a pair of strips of L section each having a radially extending flange and an axially extending web, the strips being rolled into annuli with the flange of one strip extending in and the flange of the other strip extending out, the webs of the strips having spaced openings therein and being spaced radially when the strips are assembled with the flange on each strip engaging the edge of the web on the other strip, tiltable grippers fitting in the openings, and an annular spring connecting the grippers and lying in the space between the webs.

3. A one-way clutch and bearing to fit between coaxial cylindrical races comprising an annular cage formed of a pair of strips of L section each having a radially extending flange and an axially extending web, the strips being rolled into annuli with the flange of one strip extending in and the flange of the other strip extending out, the web of each strip terminating in a relatively thin annular ring portion against which the flange of the other strip seats, and being formed with spaced openings to leave a series of spaced cross members connecting the flange to the ring portion, a series of tiltable grippers fitting between the cross members, and an annular spring connecting the grippers and lying between the webs of the strips.

4. A one-way clutch and bearing comprising an annular cage formed of an extruded strip rolled into an annulus with parallel annular side rings and inner and outer webs, the webs being formed with circumferentially spaced openings to leave spaced cross members, a series of tiltable grippers fitting between the cross members, and an annular spring connecting the grippers and lying between the inner and outer series of cross members, one series of cross members being interrupted to leave an annular opening through which the spring can be inserted.

5. A one-way clutch and bearing comprising a pair of extruded strips bent into annuli and having cylindrical surfaces to engage cylindrical races, the strips being cut out between their sides to provide a series of spaced cross members, end rings conecting the strips and holding them in coaxial spaced relationship, a series of tiltable grippers fitting between the cross members, and an annular spring connecting the grippers and lying between the strips.

6. In a one-way clutch, a cage comprising a pair of annular strips of L section each having a radially extending flange and an axially extending web, the strips being with the flange on one strip extending in and the flange on the other strip extending out, the strips being of a size to interfit to form a hollow section structure, and the webs of the strips being formed with spaced openings to leave a series of spaced cross members.

References Cited in the file of this patent

UNITED STATES PATENTS

| | | |
|---|---|---|
| 2,366,843 | Dodge et al. | Jan. 9, 1945 |
| 2,399,749 | Lund | May 7, 1946 |
| 2,404,221 | Dodge | July 16, 1946 |